United States Patent [19]
Couzy et al.

[11] Patent Number: 6,132,297
[45] Date of Patent: Oct. 17, 2000

[54] CONVEYING SYSTEM FOR CONVEYING SUBSTANTIALLY CYLINDRICAL OBJECTS SUCH AS NUCLEAR FUEL PELLETS

[75] Inventors: Jean Couzy, Pont St Esprit; Michel Marchand, Funtenay le Fleury, both of France

[73] Assignee: Compagnie Generale Des Matieres Nucleaires, Velizy Villacoublay, France

[21] Appl. No.: 09/313,482

[22] Filed: May 17, 1999

[30] Foreign Application Priority Data

May 26, 1998 [FR] France ................................ 98 06609

[51] Int. Cl.[7] ...................................................... B24B 3/00
[52] U.S. Cl. .......................... 451/245; 451/300; 451/296; 451/312
[58] Field of Search ..................................... 451/245, 300, 451/296, 312

[56] References Cited

U.S. PATENT DOCUMENTS

| 4,304,324 | 12/1981 | Huggins | 198/424 |
| 4,410,081 | 12/1981 | Weihe, Jr. | 198/725 |
| 4,468,163 | 12/1981 | King et al. | 414/63 |
| 5,048,666 | 12/1981 | Huggins, Sr. et al. | 198/536 |

FOREIGN PATENT DOCUMENTS 0 385 195 of 0000 European Pat. Off. .

*Primary Examiner*—David A. Scherbel
*Assistant Examiner*—Shantese McDonald
*Attorney, Agent, or Firm*—Pearne & Gordon LLP

[57] ABSTRACT

For conveying in single file and in a lying position substantially cylindrical objects such as nuclear fuel pellets (P) in a substantially horizontal, non-linear path, a conveying system (20) is proposed, which comprises an endless belt (26) running over pulleys having substantially vertical axes. Regulatable guides (44) maintain the objects laterally on the upper edge (30) of the endless belt (26).

12 Claims, 5 Drawing Sheets

CONVEYING SYSTEM FOR CONVEYING SUBSTANTIALLY CYLINDRICAL OBJECTS SUCH AS NUCLEAR FUEL PELLETS

DESCRIPTION

1. Technical Field

The invention relates to a conveying system for continuously conveying in single file and parallel to their axis in the direction of their axis of symmetry, substantially cylindrical objects along a non-linear path contained in a substantially horizontal plane.

A preferred, but in no way limitative application of the invention relates to the conveying of nuclear fuel pellets, particularly during their continuous manufacture.

The expected improvements concern:
1) a reduction in causes of pellet blockages, which reduce the efficiency of production,
2) a reduction in the number of interventions by operators (hence less contamination of the personnel involved),
3) minimizing the number of glove box actuators.

2. Prior Art

In an industrial manufacturing chain using a continuous process, the product being produced is processed by successive machines, between which it is conveyed by a conveying system adapted to the nature of the product.

Thus, in the case of a fluid product suitable for pumping, its transfer between the different machines ensuring its treatment or processing takes place by means of a system of pipes equipped with pumps and valves.

When the product is constituted by unitary parts or a solid, loose product, its conveying between the different machines ensuring its treatment takes place by means of a more or less complex system of successive conveyors. This system is designed as a function of the nature of the product, the production process and the configuration of the production line. It is more particularly dependent on the spatial positioning of the machines, their accessibility and the amount of space occupied in the workshop.

In a nuclear fuel pellet production workshop, the sintered pellets, conditioned loose or in bulk in boats or scoops, are turned over onto a conveyor belt supplying a vibratory feeder and are then passed from the latter, aligned in single file, to a grinder, following a substantially horizontal, but particularly sinuous path in a reduced, occupied space.

The nuclear fuel pellets are substantially cylindrical and can have different formats. Thus, their diameter can vary between 8.0 and 10.5 mm and their length between 10 and 14 mm. The pellets leave the vibratory feeder in single file and in a lying position, so that their axis is aligned with the axis of a first conveyor located at the vibratory feeder outlet. They are also introduced into the grinder in single file and in a lying position. Thus, the pellets must maintain the same position during their transfer between the vibratory feeder and the grinder.

At present, said transfer takes place when a conveying direction change is necessary by means of a complex system of successive, rectilinear conveyors of different types (belt conveyors, stranded conveyors, vibrating rails, etc.). The different rectilinear conveyors are interconnected, during their conveying path direction changes, by circular transfer tables constituted by horizontal disks rotating about their vertical axis. Thus, the pellets are carried by these conveyors and transfer disks. Moreover, in the case of belt conveyors, single strand conveyors or transfer disks, they are laterally held during their conveying by a system of fixed guides all along the followed path. In view of the fact that the nuclear fuel pellets can have variable dimensions from one model to the next, the spacing between the guides must be regulatable for each pellet format change.

The existing conveying systems give rise to a certain number of problems when direction changes are necessary.

Firstly, maintenance technicians must be able to intervene on the grinder respecting the constraints linked with any intervention in a contaminated environment. Thus, they must be able to access the different parts of the grinder and particularly the wheels using gloves equipping a glove box in which the machine is located. The operators must also have a good visibility with respect to the grinder, so as to be able to carry out an optimum monitoring of the grinding operation and particularly the pellet supply of the machine. For all these reasons, the space located in the axis of the grinder supply must be free to the greatest possible extent.

When an installation requires direction changes, the existing conveying systems all suffer from the disadvantage of a great complexity, which favours the jamming of the pellets at the interfaces. Thus, each format change for the pellets leads to long and detailed setting operations. Moreover, numerous incidents occur during production. These incidents are generally due to the crosswise positioning of the pellets giving rise to jamming effects, particularly at the intermediate disks, transfers between the conveyors and vibrating rails and at the transfer point of the pellets to the grinder supply strip. The diversity of the conveying systems also makes the setting operations particularly difficult. In summarizing, all these disadvantages lead to a significant productivity reduction and to an increase in the operating costs of the production line.

Moreover, each pellet jamming requires the intervention of an operator using gloves, leading to an operator contamination risk linked with the nature of the products carried and the frequency of the interventions.

DESCRIPTION OF THE INVENTION

The invention specifically relates to a conveying system having an original design, making it possible to transfer in single file and parallel to their axis substantially cylindrical objects in accordance with a random sinuous path, in a substantially horizontal plane using a minimum of conveying systems in a particularly simple, reliable and inexpensive manner, freeing the surrounding space to the greatest possible extent.

According to the invention, this result is obtained by means of a conveying system for the conveying in single file and in the direction of their main or major axis, substantially cylindrical objects along a non-linear path contained in a substantially horizontal plane, characterized in that it comprises:

an endless belt mounted on pulleys with axes perpendicular to said plane, so as to be able to support the objects by an upper edge of the belt and convey them in accordance with the said path, means for guiding objects along said path, above the upper edge of the belt.

In certain cases, the vertical belt conveyor could be replaced by a toroidal, monofilament conveyor, particularly when the distances between the successive direction change points are small. However, the vertical belt conveyor remains the optimum choice for longer distances (better rigidity, reduced elongation risk and notching possibility).

Due to the fact that the endless belt is placed substantially vertically and conveys the objects on its upper edge, the transfer of said objects along an optionally complex, sinuous path can take place with the aid of a single belt disposed in accordance with said path. Thus, the complete conveying system is greatly simplified. Its reliability is increased and its maintenance and costs are significantly reduced compared with the prior art conveying systems. Interventions resulting from the crosswise positioning of objects during their transfer are reduced.

In a preferred embodiment of the invention, the guidance means comprise guides placed on either side of the path to be followed by the objects. These guides preferably define between them a spacing which can be regulated or adjusted as a function of the size of the objects to be conveyed.

The upper edge of the endless belt on which the objects rest, can be straight and have a width smaller than the diameter of the objects to be conveyed.

The running of the endless belt along the non-linear path followed by the objects is ensured by driving means acting on one of the pulleys, known as the driving pulley. In order to avoid any sliding, said driving pulley then has teeth engaging on an inner, notched surface of the endless belt.

Advantageously, the conveyor according to the invention includes a continuous object loading station. This loading station then comprises a loading belt having an upper face able to support the objects and moving along a rectilinear path, sideways, parallel and in the same direction as the endless belt, in a rectilinear portion of the path followed by the objects.

In this case, the upper face of the loading belt is preferably located in a sloping and slightly downward plane in the object advance direction, so as to intersect the plane containing the upper edge of the endless belt, in accordance with an intersection line located in the aforementioned, rectilinear portion of the path.

Substantially rectilinear loading guides are then preferably centered above the loading belt, upstream of the intersection line of the planes and above the endless belt downstream of said line, so as to progressively transfer the objects from the loading belt to the endless belt.

To prevent the jamming of the objects, the endless belt advance speed then exceeds the advance speed of the loading belt.

In a preferred application of the invention, the objects to be conveyed are nuclear fuel pellets intended to be machined in a grinder, between a driving wheel and an abrasive wheel, whose axes are parallel and located in the same, substantially horizontal plane. The conveyor then includes a station for passing the pellets into the grinder, which comprises a rectilinear strip placed in the extension of another rectilinear portion of the endless belt, extending between the wheels in the pellet advance direction and whereof an upper face is laterally inclined towards the driving wheel.

Preferably, one end of the strip adjacent to the endless belt adapts to the shape thereof.

BRIEF DESCRIPTION OF THE DRAWINGS

The invention is described in greater detail hereinafter relative to a non-limitative embodiment and the attached drawings, wherein show.

DETAILED DESCRIPTION OF A PREFERRED EMBODIMENT OF THE INVENTION

Figure 1:
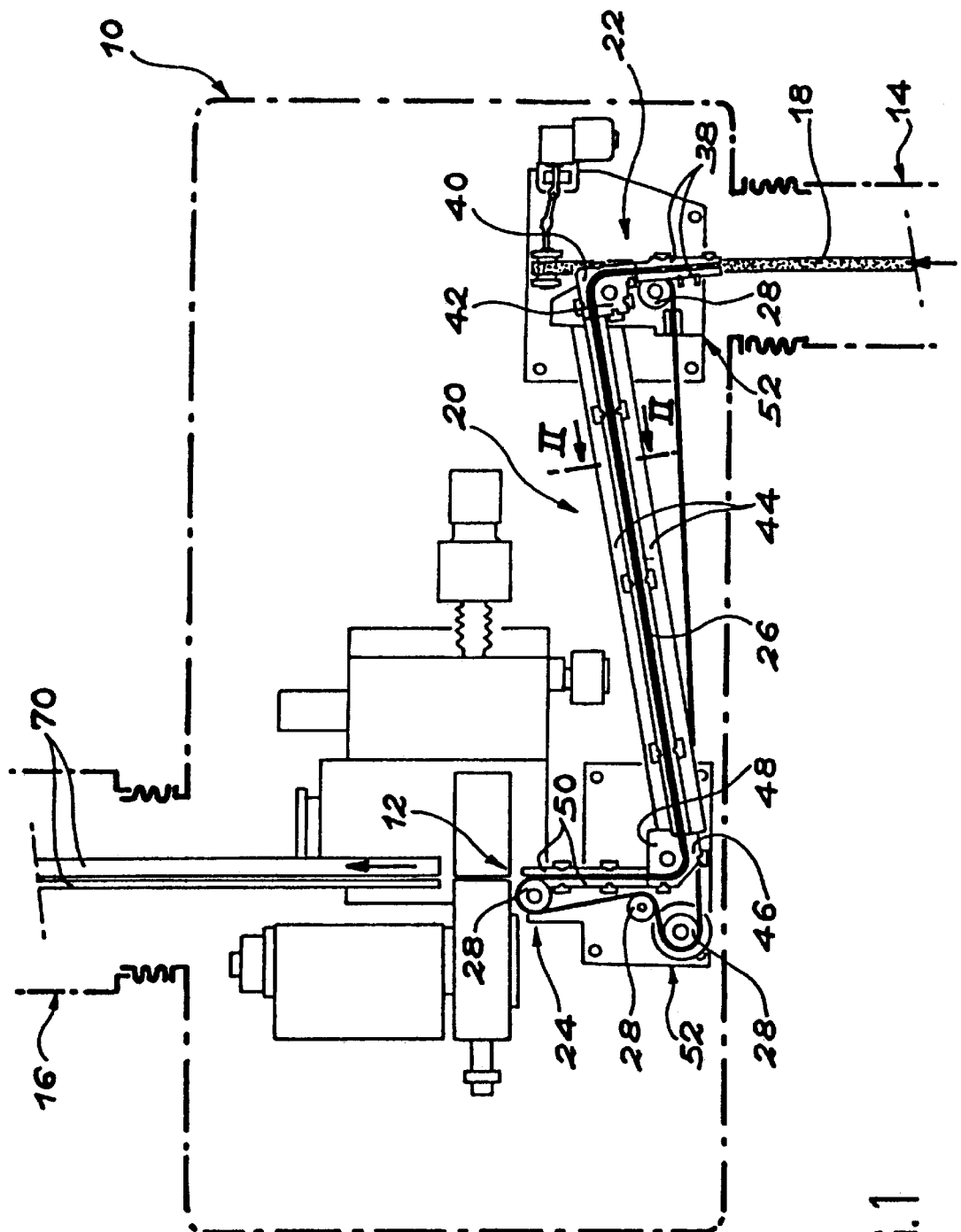
FIG. 1 A plan view very diagrammatically illustrating the path of the nuclear fuel pellets up to a grinder, by means of a conveying system according to the invention.

FIG. 1 diagrammatically shows in mixed line form a glove box 10 within which takes place one of the stages of a process for the production of nuclear fuel pellets P (FIGS. 2, 4, 5 and 6). This stage corresponds to an operation of grinding the cylindrical, outer surface of the pellets P and takes place following a sintering operation.

The grinding operation takes place by means of a grinder 12 placed in a glove box 10. The grinder 12 does not form part of the invention and can be implemented in any random manner without passing outside the scope of the invention.

The not shown, upstream glove box communicates with the glove box 10 by means of a tunnel, whose portion adjacent to the glove box 10 is diagrammatically illustrated at 14 in FIG. 1. In order to reduce to the greatest possible extent the overall dimensions of the installation and to facilitate interventions on the grinder 12, the axis of the tunnel 14 is parallel to the grinder working axis, but laterally offset over a relatively large distance with respect to said working axis.

FIG. 1 also diagrammatically shows the portion adjacent to the glove box 10 of another tunnel 16, by which the pellets passing out of the grinder 12 are routed into another, not shown glove box, which is positioned downstream and in which is installed another machine. In this case, the axis of the tunnel 16 coincides with the working axis of the grinder 12.

The continuous machining of the pellets P in the grinder 12 makes it necessary to introduce them in single line, lying manner, i.e. with their axes arranged horizontally and aligned.

In order to ensure the respecting of these conditions during the supply of the grinder 12, the pellets are already in this position, i.e. with their axes aligned and horizontal, when they penetrate the glove box 10 via the tunnel 14.

More specifically, the pellets are distributed in this position by a not shown, vibratory feeder installed in the not shown, glove box positioned upstream of the tunnel 14. The vibratory feeder deposits the pellets on a loading belt 18, which passes into the tunnel 14 and brings the pellets P into the glove box 10.

A conveying system, designated in general terms by reference 20 in FIG. 1, then carries the pellets up to the entrance of the grinder 12 within the glove box 10. This conveying system 20 ensures the transfer of the pellets P along a non-linear, relatively sinuous path in plan view contained in a substantially horizontal plane. From one end to the other of said path, the conveying system 20 maintains the pellets P in the position which they have on leaving the vibratory feeder and which they must have on entering the grinder 12, i.e. in single file and with their axes substantially horizontal and aligned.

The conveying system 20 comprises a loading interface 22 permitting the taking into account of the pellets P arriving continuously from a single, continuous loop conveyor 18, as well as a transfer interface 24 permitting the routing of the pellets into the grinder 12.

According to the invention and as is more particularly illustrated in FIGS. 1 to 4, the single, continuous loop conveyor of the conveying system 20 comprises a single endless belt 26, installed on pulleys having substantially vertical axes, all designated by the same reference 28 in the drawings. Thus, the endless belt 26 is positioned substantially vertically, which enables it to follow, over part of its path, the non-linear, substantially horizontal trajectory to be followed by the pellets within the glove box 10. As a result of this feature, it is unnecessary to use several successive conveyors, as is the case in existing conveying systems.

Figure 2:
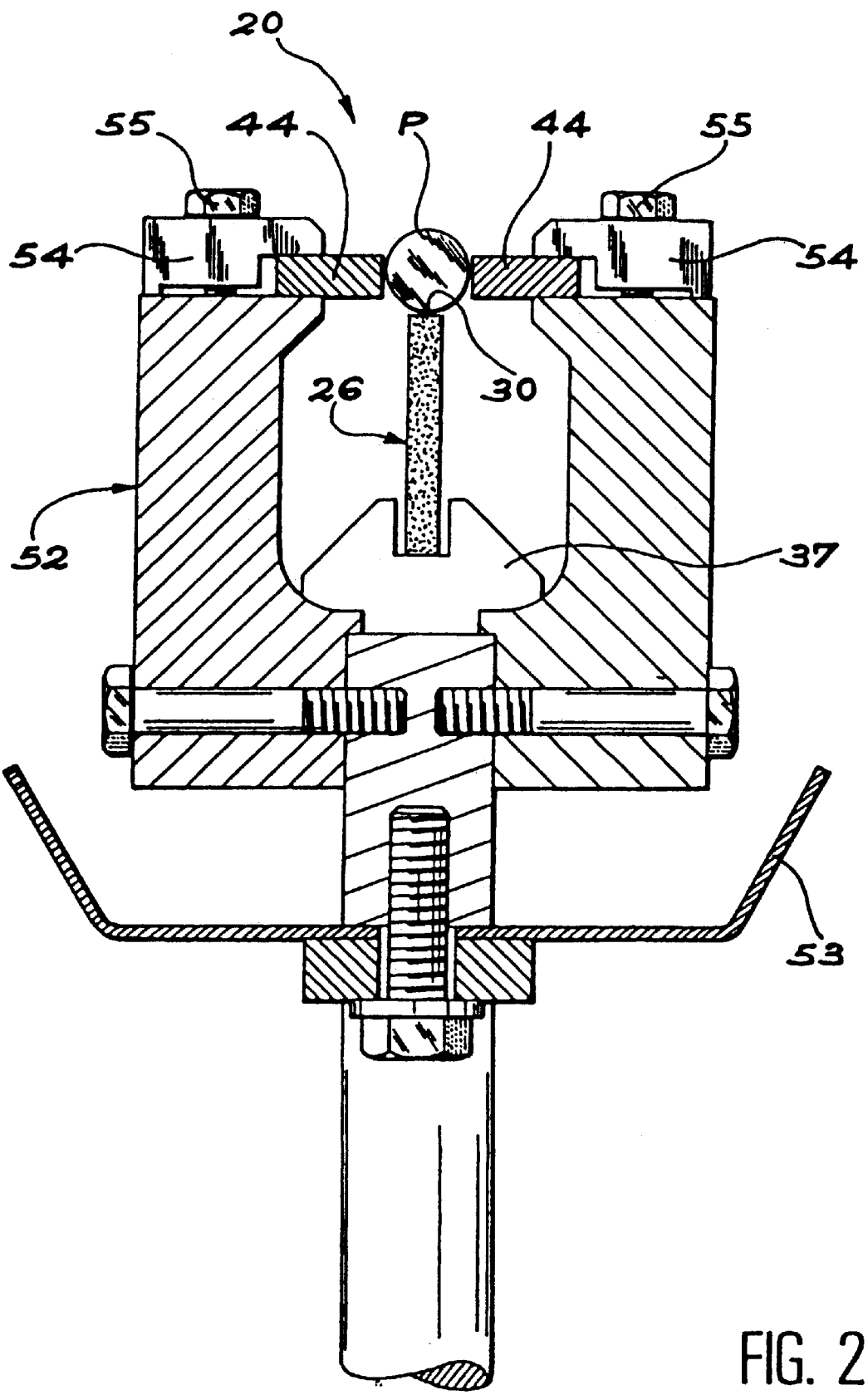
FIG. 2 A cross-section on a larger scale along line II—II of FIG. 1.

As is more particularly illustrated by FIG. 2, the endless belt 26 has a planar, horizontal, upper edge 30, on which the pellets P rest. More specifically, each cylindrical pellet P rests by a generatrix of the cylinder on the upper edge 30 of the endless belt 26, so that its axis is permanently tangential to the non-linear trajectory followed by the endless belt, in the part of its path used for supporting the pellets.

The endless belt 26 has a rectangular section, whose width, which corresponds to the width of the upper edge 30, is smaller than the diameter of the pellets P.

It should be noted that in a variant, instead of being planar in the manner shown in FIG. 2, the upper edge 30 of the endless belt 26 can have a slightly concave, upwardly turned profile. Thus, the cylindrical pellets P are naturally positioned at the bottom of the concavity under the effect of their own weight. Their vertical plane of symmetry then substantially coincides with the vertical, median plane of the endless belt 26.

The advance of the endless belt 26 is ensured by driving means constituted by a single, not shown motor continuously rotating at a uniform speed any random one of the pulleys 28, known as the driving pulley. This arrangement makes it possible to reduce to the strict minimum the maintenance operations on the conveying system 20.

Figure 3:
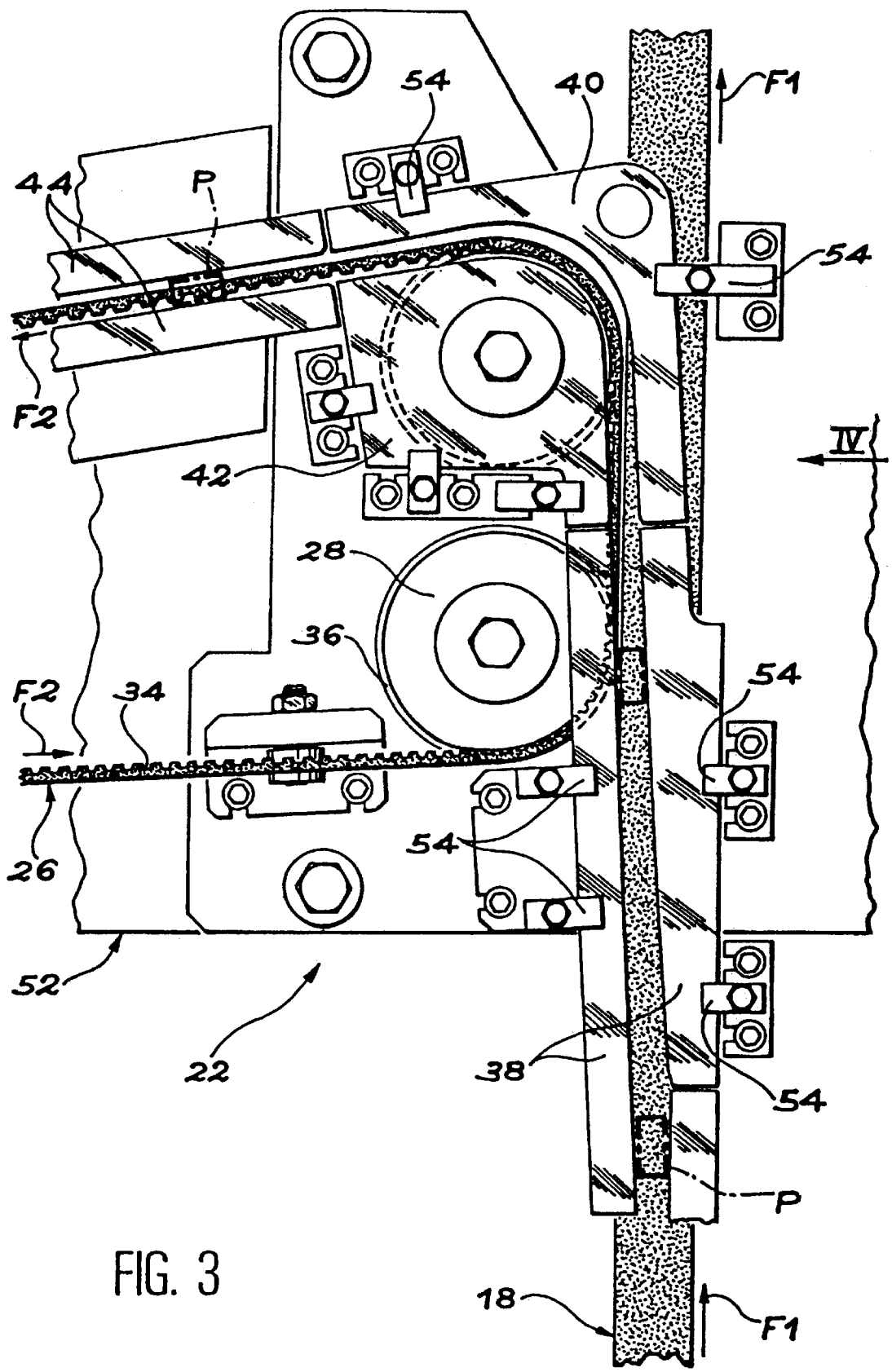
FIG. 3 A plan view showing on a larger scale part of the conveying system according to the invention, including a pellet loading station.
Figure 5:
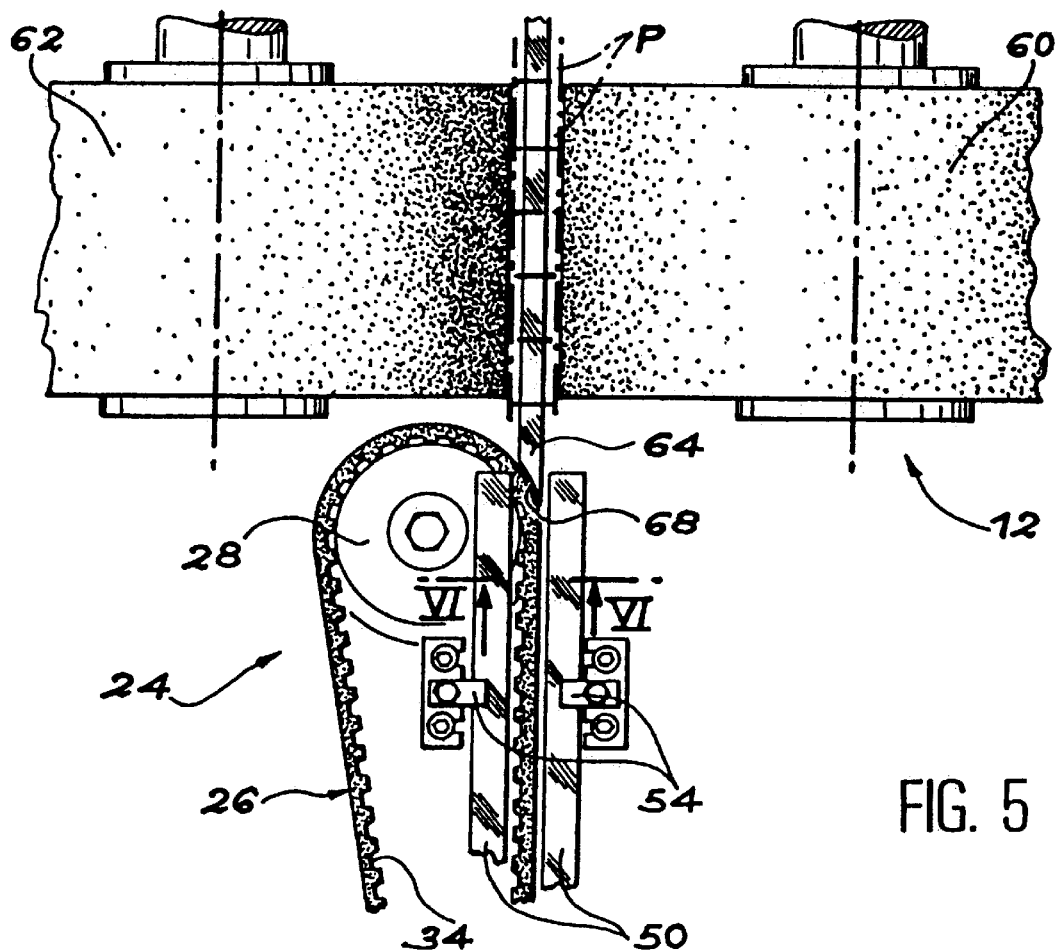
FIG. 5 A plan view illustrating in greater detail another part of the conveying system according to the invention, including a station for passing the pellets into the grinder.

To prevent any relative sliding between the endless belt 26 and the driving pulley, the endless belt advantageously has a notched, inner surface 34, as shown in FIGS. 3 and 5. The driving pulley 28 then has a complimentary tooth system meshing with the notches formed on the inner surface 35 of the endless belt.

Means are also provided for maintaining the endless belt 26 in an invariable, substantially vertical position. These means can be provided between the endless belt 26 and the pulleys 28 and then e.g. comprise shoulders 36 (FIGS. 3 and 4) formed on the pulleys 28 and against which bears the lower edge of the endless belt 26. As illustrated in FIG. 2, the endless belt maintaining means can also comprise U-shaped supports 37, on which rests the lower edge of the belt.

The conveying system 20 according to the invention also comprises guidance means, making it possible to maintain the pellets on the upper edge 30 of the endless belt 26, along the trajectory which they must follow within the glove box 10.

These guidance means comprise lateral guides placed on either side of the path followed by the pellets P, all along its length, at a level above the upper edge 30 of the belt 26. The level of the lateral guides is such that each of the pellets P is in contact with said guides, level with its axis, at any point of its trajectory and no matter what type of pellet is being conveyed.

Figure 4:
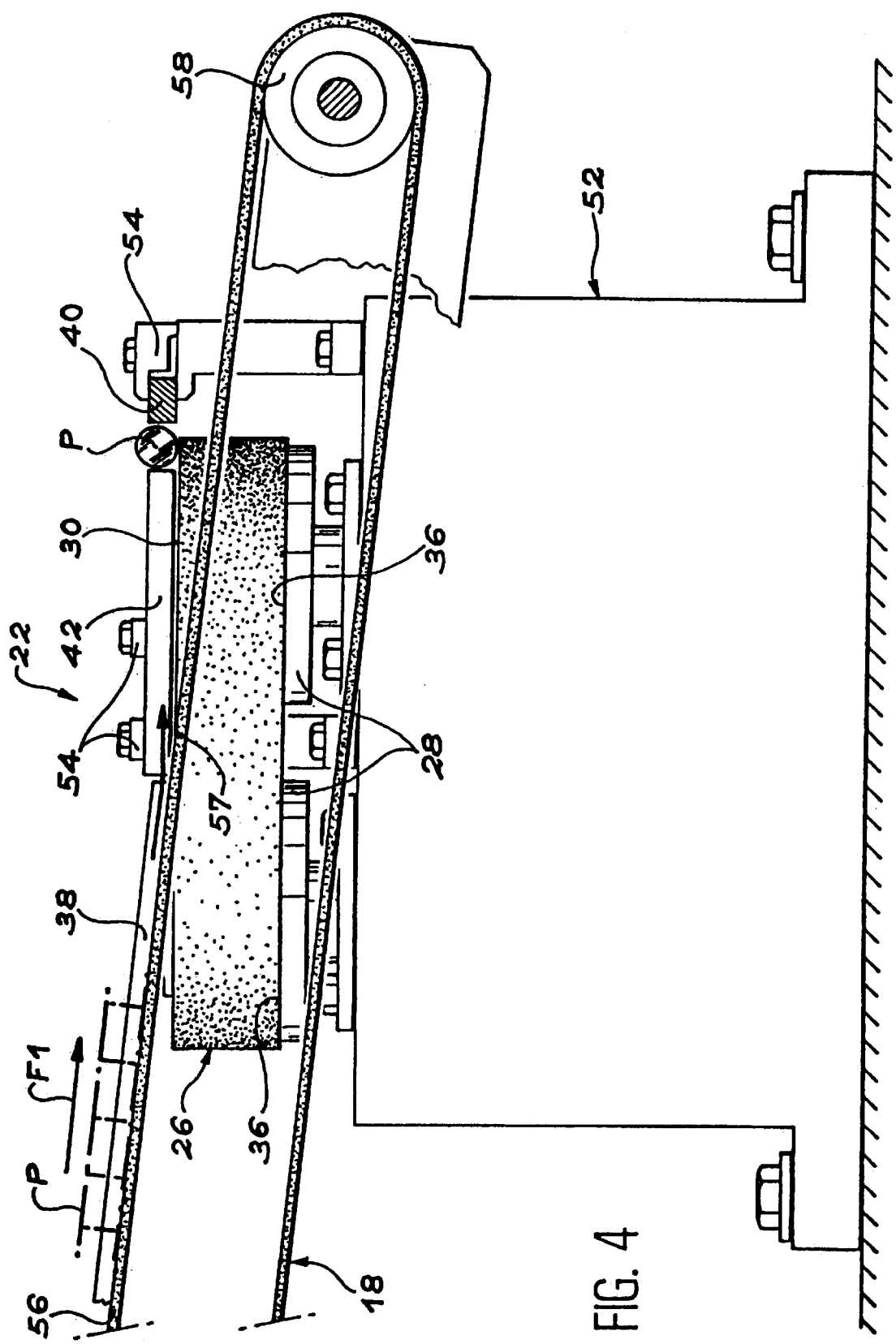
FIG. 4 A side view along arrow IV in FIG. 3.

More specifically, in the case of the approximately Z-shaped trajectory illustrated in FIG. 1, in the pellet displacement direction, the guidance means comprise a first pair of rectilinear guides 38 (FIGS. 1 and 3), a first pair of outer 40 and inner 42 circular arc guides (FIGS. 1 and 3), a second pair of rectilinear guides 44 (FIGS. 1 and 2), a second pair of outer 46 and inner 48 circular arc guides (FIG. 1) and a third pair of rectilinear guides 50 (FIGS. 1, 4 and 5). The guides 38, 40 and 42 belong to the loading station 22 and the guides 50 to the station 24 for routing the pellets P into the grinder 12.

All the guides 38, 40, 42, 44, 46, 48 and 50 are installed on the same fixed chassis 52 by means of clamps 54 joined to the chassis by screws 55. These screws 55 can be slackened in order to free the clamps 54 and release the guides 44 in order to regulate the spacing thereof, when there is a change to the diameter of the pellets P during manufacture. It is therefore easily possible to regulate the spacing of the guides.

It should be noted that the spacing between the different guides is determined in such a way as to prevent any risk of dropping or crosswise positioning of the pellets with respect to their displacement direction during transfer, particularly at the station 24 for routing the pellets into the grinder. Moreover, friction of the pellets on the guides is at a minimum and only gives rise to minimum wear.

However, it is possible to provide a chute 53 (FIG. 2) beneath the endless belt 26, all along the path followed by the pellets P, in order to recover any small pieces or fragments released therefrom and so as to prevent the dispersion thereof on the bottom of the glove box.

In the curved portions of the path followed by the pellets, the outer guides 40 and 46 oblige the pellets to follow the path imposed, whereas the inner guides 42 and 48 prevent the crosswise positioning of the pellets on the conveyor and the jamming which would result therefrom.

Thus, the guidance means have the effect of maintaining the cylindrical pellets in a position such that their axis is always substantially tangential to the path followed.

A more detailed description will now be given of the station 22 for the continuous loading of the cylindrical pellets P onto the endless belt 26, with reference to FIGS. 3 and 4. This loading station 22 comprises the loading belt 18, by which the pellets P are routed into the glove box 10 through the tunnel 14.

More specifically, the pellets P rest in single file and with their axes aligned on the upper face 56 (FIG. 4) of the loading belt 18, which is arranged in conventional manner on substantially horizontally axed pulleys, whereof one is illustrated at 58 in FIG. 4. Not shown, associated, rectilinear guides ensure the lateral maintenance of the pellets on the upper face 56 of the loading belt 18, up to the vicinity of the transfer interface 22.

The upper face 56 of the loading belt 18 then moves along a rectilinear path symbolized by the arrows F1 in FIGS. 2 and 3, on one side of the endless belt 26, in a rectilinear portion of its trajectory corresponding to the loading station 22. As is more particularly visible in FIG. 3, the edge of the loading belt 18 adjacent to said rectilinear portion of the endless belt 26 forms with the outer surface of the latter a reduced, functional clearance in plan view.

The upper face 56 of the loading belt 18 moves in parallel and in the same direction as the upper edge 30 of the aforementioned rectilinear portion of the endless belt 26. However, the advance speed of the endless belt 26 (arrows F2 in FIG. 3) preferably slightly exceeds that of the loading belt 18, in order to prevent any jamming risk when the pellets P are transferred from the belt 18 to the belt 26.

In order that the transfer can take place in the manner illustrated in FIG. 4, the upper face 56 of the loading belt 18 is located in a slightly downward, sloping plane in the advance direction of the pellets P, symbolized by the arrow F1. This plane intersects that containing the upper edge 30 of the endless belt 26 along an intersection line 57 located in the central zone of the rectilinear portion of its trajectory level with the loading station 22.

Moreover and as is more specifically illustrated in FIG. 3, the rectilinear guides 38 and the entry portion of the guides 40 and 42 force the pellets to follow a substantially rectilinear path, whose starting point is centered above the loading belt 18 and whose arrival point is centered above the endless belt 26. More specifically, the starting and arrival points of said substantially rectilinear path are respectively located upstream and downstream of the intersection line 57 of the sloping plane containing the upper face 56 of the loading belt 18 and the substantially horizontal plane containing the upper edge 30 of the endless belt 26.

As a result of the arrangement which has been described, the lying pellets conveyed in single file form on the loading belt 18 are progressively pushed towards the side of said belt on which is located the endless belt 26 and are then brought above the latter. When the pellets are approximately astride the two belts, their support is transferred from the upper face 56 of the loading belt 18 to the upper edge 30 of the endless belt 26, on passing the intersection line 57. The loading of the pellets in a lying, single file position on the upper edge 30 of the endless belt 26 is thus ensured without any discontinuity and without any jamming risk, due to the slightly higher speed of the endless belt 26.

Figure 6:
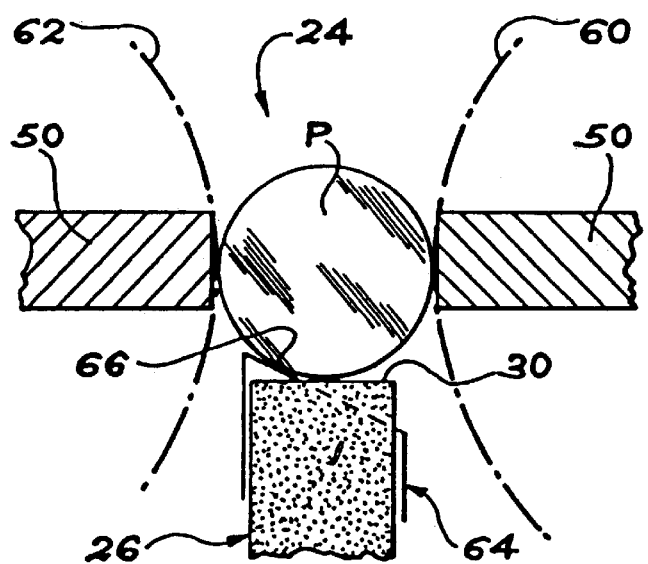
FIG. 6 A larger scale sectional view along line VI-VI of FIG. 5.

The station 24 for passing or routing the pellets P into the grinder 12 will now be described relative to FIGS. 5 and 6. As illustrated in the latter, the grinder comprises a driving wheel 60, as well as an abrasive wheel 62, whose axes are parallel to one another in a substantially horizontal plane. As illustrated in FIG. 6, the axes of the pellets P are slightly below said plane when the peripheral surface thereof is machined. The upper edge 30 of the endless belt 26 is consequently located in a substantially horizontal plane displaced downwards with respect to the plane containing the axis of the wheels. This displacement makes it possible to ensure a satisfactory positioning of the pellets in the grinder, no matter what the diameter of the pellets during manufacture.

At the station 24 for routing the pellets into the grinder, the endless belt 26 has a rectilinear portion, whose median, vertical plane coincides with the plane of symmetry of the axes of the wheels 60 and 62. Beyond said rectilinear portion, the endless belt 26 laterally escapes in the form of a curved portion received on one of the pulleys 28 (FIG. 5).

The transfer of the pellets from the rectilinear portion of the endless belt 26 to the region located between the wheels 60 and 62 and then beyond the same, takes place by means of a rectilinear strip 64 placed in the extension of the aforementioned, rectilinear portion of the endless belt 26.

More specifically, said strip 64 has an upper edge 66 substantially at the same level as the upper edge 30 of the endless belt 26, but laterally inclined towards the driving wheel 60, as illustrated in FIG. 6. This arrangement makes it possible to automatically bring the peripheral surface of each of the pellets P into contact with the driving wheel 60, no matter what the pellet diameter.

As is more particularly shown in FIG. 5, the entry end 68 of the strip 64, turned towards the endless belt 26, has a curved and approximately bevel shape in plan view. This end 68 closely adopts the shape of the adjacent, inwardly curved portion of the endless belt 26, extending the rectilinear portion thereof beyond which the pellets are transferred onto the strip 64.

On either side of the wheels 60 and 62, i.e. both at the entrance and exit of the grinder 12, the pellets P are laterally positioned by rectilinear guides. These guides are constituted by the aforementioned guides 50 at the grinder entrance and the guides 70 at its exit and in the tunnel 16 (FIG. 1).

Obviously, the invention is not limited to a conveying system for conveying nuclear fuel pellets. It can also apply to the single file, lying conveying of all substantially cylindrical objects approximately having a maximum, uniform diameter. Although only endless belts having a substantially rectangular cross-section and with a greater width than thickness have been hitherto described, other belt cross-sections are possible and the possibility also exists of carrying pellets or other objects on oblong or toroidal section belts (i.e. wires or cables) without any significant modification to the remainder of the installation. It would merely be necessary to avoid interferences between the driving pulleys and the conveyed objects, e.g. by placing the pulleys below the upper face of the belt or by making them with grooves sideways of said upper face. Smaller sections would give flexibility to the belt, which would make its installation, extraction and replacement easier and would be preferable for sinuous paths. However, if the conveyed objects had to cover paths with long free lengths between the pulleys, preference would be given to the use of longer or higher belts as a result of their greater rigidity.

What is claimed is:

1. A conveying system for continuously conveying, in single file and in the direction of a longitudinal axis thereof, substantially cylindrical objects along a non-linear path contained in a substantially horizontal plane, said system comprising:

an endless belt mounted on pulleys having axes perpendicular to said plane, whereby an upper edge of, said belt follows said non-linear path, said objects being adapted to rest on said upper edge by gravity;

driving means adapted to move said endless belt along said non-linear path; and guidance means, for guiding the objects along said non-linear path, above the upper edge of said belt.

2. Conveying system according to claim 1, wherein the guidance means comprise guides placed on either side of the path.

3. System according to claim 2, wherein the guides define between them a spacing regulatable as a function of the size of the objects to be conveyed.

4. Conveying system according to claim 2, wherein a continuous loading station comprises a loading belt having an upper face (56) able to support the objects, moving along a rectilinear path, sideways, parallel and in the same direction as the endless belt, in a rectilinear portion of said path.

5. Conveying system according to claim 4, wherein the upper face of the loading belt is located in a slightly downward, sloping plane in the advance direction of the objects, so as to intersect the plane containing the upper edge of the endless belt, along an intersection line located in said rectilinear portion of the path.

6. Conveying system according to claim 5, wherein substantially rectilinear loading guides are centered above the loading belt upstream of the intersection line of said planes and above the endless belt downstream of said line, so as to progressively transfer the objects from the loading belt onto the endless belt.

7. Conveying system according to claim 6, wherein the endless belt advance speed exceeds the loading belt advance speed.

8. Conveying system according to claim 1, wherein the upper edge of the endless belt is straight and has a width smaller than the diameter of the objects to be conveyed.

9. Conveying system according to claim 1, wherein driving means act on a first of the pulleys.

10. Conveying system according to claim 9, wherein the endless belt has a lower, notched surface meshing with teeth formed on-the first pulley.

11. Conveying system for the continuous conveying in single file and in the direction of their greatest axis substantially cylindrical objects in accordance with a nonlinear path contained in a substantially horizontal plane, said system comprising;

an endless belt installed on pulleys having axes perpendicular to said plane, so as to support the objects by an upper edge of the belt and convey them in accordance with said path, and means for guiding the objects along said path, above the upper edge of the belt, wherein the objects to be conveyed are nuclear fuel pellets to be machined between a driving wheel and an abrasive wheel of a grinder, having parallel axes and located in the same substantially horizontal plane, a station for routing pellets into a grinder incorporating a rectilinear strip placed in the extension of another rectilinear portion of the endless belt, extending between the wheels in the pellet advance direction and whereof an upper face is laterally inclined towards the driving wheel.

12. Conveying system according to claim 11, wherein one end of the strip adjacent to the endless belt adopts the shape of the latter.

* * * * *

UNITED STATES PATENT AND TRADEMARK OFFICE
CERTIFICATE OF CORRECTION

PATENT NO. : 6,132,297
DATED : October 17, 2000
INVENTOR(S) : Couzy et al.

It is certified that error appears in the above-identified patent and that said Letters Patent is hereby corrected as shown below:

<u>Column 9, claim 7,</u>
Line 1, delete "claim 6", and insert therefor -- claim 4 --.

Signed and Sealed this

Second Day of October, 2001

Attest:

NICHOLAS P. GODICI
Attesting Officer      Acting Director of the United States Patent and Trademark Office